United States Patent Office 3,776,873
Patented Dec. 4, 1973

3,776,873
SPRAYABLE COMPOSITIONS
Leon V. Kremer, Cottage Grove Village, Minn., assignor to Minnesota Mining and Manufacturing Company, St. Paul, Minn.
No Drawing. Filed July 22, 1968, Ser. No. 746,245
Int. Cl. C08f 45/28, 45/30; C09k 3/30
U.S. Cl. 260—29.1 R                    10 Claims

ABSTRACT OF THE DISCLOSURE

Solutions of a polymeric base material and a volatile organic liquid at solid contents hitherto nonsprayable are rendered sprayable, either for aerosol or non-aerosol applications, by the inclusion of an organic compound, either a volatile liquid or a gas at room temperature and pressure, and a carbonated metal salt of an acid having at least 12 aliphatic carbon atoms and a metal ratio of at least 3. The polymeric base of such a composition is in the form of relatively small, discrete non-agglomerating particles capable of passing through the orifice nozzle of conventional aerosol or non-aerosol equipment.

---

This invention relates to sprayable compositions.

Spray application of adhesives, coatings, etc. is highly desirable from the standpoint of convenience and economy. Aerosol packages are particularly attractive in terms of portability. To date, however, difficulties in achieving high solids content sprayable compositions, especially elastomer based compositions, either for conventional or aerosol application, have deterred general availability of such products. For non-aerosol spraying, a solution of a polymeric base material in a volatile organic liquid is employed. Only at extremely low solids content can such compositions be sprayed with low pressure equipment due to the pronounced tendency of the polymer to conglomerate and issue in the form of cobwebs or adherent strings. Economy gained in the use of low pressure equipment is lost in the excessive amounts of diluent or carrier liquid required. Performancewise, such compositions suffer both from the reduced level of polymer and the increased level of diluent which tends to soak in or otherwise prove detrimental to the substrate to be sprayed. On the other hand, resort to high pressure spray equipment is highly disadvantageous, particularly in respect to the large volumes of air required. Also, the bulk of equipment makes portability of operation unfeasible. Difficulty in localizing the spray to prevent spraying unwanted objects is another problem with high pressure equipment.

In aerosol applications, the primary source of the difficulty is the incompatibility between the propellants and the polymeric compositions to be sprayed. Incompatibility manifests itself in the formation of an unsprayable conglomerate mass of polymer as the propellant is introduced into the aerosol container. At high carrier liquid-low solids contents, the effect of the incompatible propellant is subdued but this expedient is unacceptable from an economic, efficiency, and performance standpoint due to the use of excessive amounts of carrier liquid.

In addition to the use of high pressure equipment to obtain non-aerosol sprayability or the use of low solid content compositions for aerosol applications, both of which expedients are commercially unsatisfactory, other methods have been utilized to arrive at a satisfactorily sprayable high solids content polymeric based composition. One such method involves the use of cross-linked, nearly insoluble polymers. This technique is obviously limited to cross-linkable polymers which often do not represent the optimum material for the particular job at hand. Addition of large amounts of insoluble filler is sometimes employed but this expedient nearly always detracts severely from the adhesive properties. Another approach is the use of high molecular weight, insoluble polymers extracted from latices, but such polymers are difficult to make and generally produce inferior products due to difficulty in eliminating water from the product. Still another technique involves the use of water emulsions which spray well at high percent solids but are very slow drying and usually foam badly in the presence of propellant.

It is therefore the primary object of this invention to provide sprayable and aerosol sprayable polymeric based compositions suitable as adhesives, coatings and the like.

This and other objects which will become more apparent hereinafter are provided by the present invention which in general is a sprayable composition comprising a polymeric material, a volatile organic carrier liquid compatible with said polymeric material, an incompatibilizing agent adapted and sufficient to render said polymeric material insoluble in said volatile organic carrier liquid, and an oil soluble, carbonated basic metal salt of an organic acid having at least 12 aliphatic carbon atoms and a metal ratio of at least about 3.

The incompatibilizing agent is generally a volatile organic material; either a liquid or gas at room temperature (20° C.) and atmospheric pressure (760 mm. Hg). For aerosol applications, this agent is generally the propellant which is a gas under the above conditions. For non-aerosol applications, such agent is generally a liquid miscible with the carrier liquid but a non-solvent for the polymeric material. Whichever type of spraying is desired, the incompatibilizing agent functions in essentially the same manner by disrupting the solution of carrier liquid and polymer to the extent that relatively small, discrete polymer particles precipitate out of solution. The solution referred to, while perhaps not a true solution, is a macroscopically homogeneous mixture and for purposes of this invention will be termed a solution.

In the absence of the carbonated metal salts, the polymeric material precipitating out from solution will form an unsprayable conglomerate mass due to the sticky, adherent nature of the polymer. In the presence of these metal salts, the polymer forms small, discrete particles which disperse in the liquid components present to form a composition which can be readily sprayed either by low pressure, nonaerosol or conventional aerosol means. In general, the particle size is on the order of 0.025 inch in diameter or less.

The oil soluble, carbonated basic metal salts of an organic acid having at least 12 aliphatic carbon atoms and a metal ratio at least about 3, and preferably at least about 10, are described in several patents assigned to the Lubrizol Corp., including U.S. Pats. Nos. 3,172,855; 3,242,079; 3,256,186; 3,282,835; and 3,312,618. The organic acids may be selected from the class including sulfonic acids, naphthenic acids, alkylated aromatic carboxylic acids, phosphorus thioic acids, and the metal salts thereof. Specific examples of such acids are listed in U.S. Pat. 3,312,618, especially columns 4–6. Preferred are the sulfonic acids and carboxylic acids and metal salts thereof as well as mixtures of such acids or salts. The sulfonic acids may be derived from bright stock as described in U.S. Pat. No. 3,282,835.

The acid should contain at least about 12 aliphatic carbon atoms in the molecule. The sulfonic acids include the aliphatic and the aromatic sulfonic acids. They are illustrated by petroleum sulfonic acids or the acids obtained by treating an alkylated aromatic hydrocarbon with a sulfonating agent, e.g., chlorosulfonic acid, sulfur trioxide, oleum, sulfuric acid, or sulfur dioxide and chlorine. The sulfonic acids obtained by sulfonating the alkylated benzene, naphthylene, phenol, phenol sulfide, or diphenyl oxide are especially useful.

Specific examples of the sulfonic acids are mahogany acid, mono-wax (eicosane)-substituted naphthylene sulfonic acid, dodecylbenzene sulfonic acid, didodecylbenzene sulfonic acid, dinonylbenzene sulfonic acid, octadecyl-diphenyl ether sulfonic acid, octadecyl-diphenyl amine sulfonic acid, cetylchlorobenzene sulfonic acid, biscetylphenyl disulfide sulfonic acid, cetoxy-caprylbenzene sulfonic acid, dilauryl beta-naphthalene sulfonic acid, the sulfonic acid derived by the treatment of polyisobutene having a molecular weight of 1500 with chloro sulfonic acid, nitronaphthylene sulfonic acid, paraffin wax sulfonic acid, cetyl-cyclopentane sulfonic acid, lauryl-cyclohexane sulfonic acid, and polyethylene (molecular weight of 750) sulfonic acid, etc. The carboxylic acids likewise may be aliphatic or aromatic acids. They are exemplified by palmitic acid, stearic acid, myristic acid, oleic acid, linoleic acid, behenic acid, hexatriacontanole acid, tetrapropylene-substituted glutaric acid, polyisobutene (molecular weight of 5000)-substituted succinic acid, polypropylene (molecular weight of 10,000)-substituted succinic acid, octadecyl-substituted adipic acid, chlorostearic acid, 9-methylstearic acid, dichlorostearic acid, stearylbenzoic acid, poly wax (eicosane)-substituted naphthoic acid, dilauryldecahydronaphthylene carboxylic acid, didodecyl-tetralin carboxylic acid, dioctyl-cyclohexane acid, and the anhydrides of such acids.

A convenient process for preparing the metal salts comprises carbonating a substantially anhydrous mixture of the acid with at least about 3 chemical equivalents of an alkaline earth metal base per equivalent of the acid in the presence of a promoting agent. The metal base may be an alkaline earth metal oxide, hydroxide, bicarbonate, sulfide, mercaptide, hydride alcoholate, or phenate. It is preferably an oxide, alcoholate, or hydroxide of barium or calcium. The carbonation is carried out in a solvent which is preferably mineral oil. The solvent may be n-hexane, naphtha, n-decane, dodecane, benzene, toluene, xylene, or any other fluid hydrocarbon.

The promoting agents, preferably an alcohol or a phenol, are those described in U.S. Pat. No. 3,242,079, col. 4 especially.

Preferred carbonated metal salts are the calcium and barium salts of alkyl aryl sulfonates such as calcium didodecyl benzene sulfonate complexed with calcium carbonate and having a metal ratio of about 14. Commercially available carbonated metal salts suitable in the practice of this invention are "Ircogel 900," "Ircogel 901," and "Ircogel 902," trade names for a carbonated metal salt of an organic acid available from the Lubrizol Corp. Other suitable metal salts include the carbonated zinc salts of the organic acids available from the Lubrizol Corp. under the trade designations O.S. 18273A, B, and C. Ircogel 901 and Ircogel 902 contain the carbonated metal salt diluted with dioctyl phthalate and xylene, respectively. As commercially available, these particular products are combined with a mineral oil. In some cases, the oil has proved detrimental to adhesive and coating properties and is removed by conventional extraction techniques.

The amount of metal salt is not critical. Sufficient metal salt should be present to insure that the polymeric base will precipitate out as small, discrete, non-adherent particles, generally less than about .025 inch in the major dimension. As little as 3% based on the weight of the polymer base has proved satisfactory although generally 5% or higher is desired. The term "metal ratio" is used herein in the sense employed in the above mentioned patents assigned to the Lubrizol Corp. The term designates the ratio of the total chemical equivalents of the metal in the metal salt to the chemical equivalents of the metal which is in the form of a normal salt, i.e., a neutral salt of the acid. To illustrate, a metal salt having 5 equivalents of metal per equivalent of the organic acid radical has a metal ratio of 5.

Carrier liquids suitable in the practice of this invention are volatile organic liquids compatible with the particular polymeric base material employed to form a homogeneous mixture or solution therewith. In addition to solubility, choice of the carrier liquids involves consideration of the drying rate of solvent and the effect of solvent on the substrate to be sprayed. Fast drying solvents are the low boiling organic liquids such as acetone, hexane, and petrobenzol. Esters and ketones may craze styrene plastic substrates and should be avoided in such cases. Paper or other cellulosic substrates containing saturants may be deleteriously effected by aromatics, ketones and esters; aliphatic solvents are preferred for such substrates. Preferably, the carrier liquid (including blends) and the polymeric base are compatible or form homogeneous mixtures in all proportions.

A variety of polymeric base materials may be employed in the practice of this invention. The effect of the above-described carbonated metal salts appears to be general to a mixture of polymer, solvent, and incompatibilizing agent which are present in such amounts that the polymer and solvent will form a solution or homogeneous mixture which the incompatibilizing agent can disrupt to cause precipitation of the polymer. Elastomeric materials are preferred, mainly because these materials find wide application in adhesive, coating, and sealant formulations. Exemplary of the polymeric base materials are chloroprene, styrene-butadiene rubber (SBR), acrylonitrile-butadiene rubber (NBR), urethanes, polyvinyl chloride, polyacrylates, and butyl rubber.

The spray compositions are suitably prepared by forming the solution of the polymeric base material and volatile, organic carrier liquid, adding the carbonated metal salt to such solution, and then adding the incompatibilizing agent, preferably slowly with agitation, at least until the polymeric base material begins precipitating out of solution. Preferably, addition of the incompatibilizing agent is continued for a short period after precipitation begins in order to insure that redissolution does not occur. A 10% by weight excess based on the weight of incompatibilizing agent needed to institute precipitation is adequate although that value is not critical. In the presence of the carbonated metal salt, the polymeric base material precipitates out as discrete, small particles to form a dispersion which is stable for several minutes up to several hours before stratification occurs, after which the product may be readily redispersed by shaking to form a sprayable mixture. Suitable thixotropic agents may be added to inhibit stratification, exemplary ones being "Thixin R," trade name for a vegetable oil derivative available from Baker Castor Oil Products Co., and "Butoxyne 160," trade name for a N-alkyl-gamma-hydroxy butyramide available from General Aniline & Film Corp.

To provide a better understanding of this invention, the following non-limiting examples are provided wherein all parts and percentages are by weight unless otherwise stated.

Example 1

This example illustrates the preparation of a sprayable adhesive composition having chloroprene rubber as the polymeric base material.

TABLE I

| Ingredient: | Parts by weight per hundred parts polymer |
|---|---|
| Neoprene WHV[a] | 100 |
| Maglite M[b] | 20 |
| CKR 1634[c] (para-tertiary butyl phenol formaldehyde resin) | 50 |
| $Z_nO$ | 5 |
| Toluene | 84 |
| Acetone | 301 |
| Petrol-benzol | 367 |
| Water | 1 |

[a] Trade name for a chloroprene rubber available from E. I. du Pont & Co.
[b] Union Carbide Corp. trade name for a para-tertiary butyl 15 phenol formaldehyde resin.

A sprayable composition containing 10% solids by weight is prepared from the ingredients of Table I according to the following technique. The Neoprene WHV is milled on a conventional rubber mill and then cut into small pieces. The Maglite M, zinc oxide, and para-tertiary butyl phenol formaldehyde resin (CKR 1634) and about one half of the petrol-benzol are mixed under high speed agitation in a Kady mill. The milled and cut Neoprene WHV is then added to this mixture together with the remainder of the solvents (toluene, acetone, petrol-benzol, and water). This mixture is then stirred until the solid ingredients go into solution.

To 100 g. of this solution is added 5 g. of Ircogel 902 with mixing until smooth. This mixture is then added to an aerosol can which is then fitted with a Newman-Green R–10–118 valve through which is then added with agitation 70 cc. of a 1/1 by weight blend of Freon 11/ Freon 12. The resulting composition is sprayable from the aerosol can in a uniform spray pattern with essentially no cobwebbing and no excessive misting. The composition further exhibits acceptable adhesive properties when used to bond various substrates in normal bonding operations, e.g., wood to steel or wood to cloth.

EXAMPLE 2

A non-aerosol sprayable composition is prepared from the composition described in Example 1 with the exception that the Freon propellant is replaced by 35 cc. of hexane. The resulting compositions, when sprayed through a Binks Model P-CGA–501FF spray apparatus at an atomization and fluid pressure of 5 pounds and less than 1 cu. ft./min. of air, issues in a uniform spray pattern without cobwebbing or excessive misting.

EXAMPLE 3

An aerosol sprayable composition is obtained using the composition of Example 1 with the exception that the Freon 11/Freon 12 propellant is replaced with 54 cc. of a 1/1 by weight mixture of propane and isobutane.

EXAMPLE 4

An aerosol sprayable composition is prepared from the following ingredients:

| | G. |
|---|---|
| Pale crepe | 20 |
| Hexane | 100 |
| Ircogel 902 | 20 |
| Propane/isobutane (1/1 by weight) | 120 |

A solution of the crepe and hexane is prepared and the Ircogel 902 is added thereto with agitation. This mixture is added to an aerosol container which is then fitted with a Newman-Green R–10–118 valve. Through the valve is added slowly with agitation the propane/isobutane propellant. The composition issues as a uniform spray without cobwebbing or excessive misting.

EXAMPLE 5

A non-aerosol composition is prepared from the composition of Example 4 replacing the propellant with ethanol. When sprayed through the spraying equipment of Example 2, a uniform spray pattern is formed without cobwebbing or excessive misting.

EXAMPLE 6

A conventional adhesive is prepared from the following ingredients:

| Material: | Weight (g.) |
|---|---|
| Styrene-butadiene rubber | 100 |
| Super Beckacite 1001[a] | 56.4 |
| Maglite M | 9.0 |
| Hercules S 1010[b] | 38.0 |
| Naphtha blend | 134.2 |
| Petro-benzol | 441.6 |
| Water | 1.0 |
| 26.0% solids by weight. | |

[a] Trade name for an oil-reactive thermosetting phenolic resin available from Reichhold Chem. Co.
[b] Trade name for a polyterpene rosin available from Hercules Chem. Corp.

The SBR rubber is milled on a rubber mill using a standard milling cycle, then cut into pieces and put into solution with the remainder of the ingredients in a mixer.

For this adhesive composition, an aerosol sprayable composition is prepared employing the following ingredients:

| Material: | Amount (g.) |
|---|---|
| Adhesive—26.0% solids | 100 |
| Calcium didodecyl benzene sulfonate complexed with barium carbonate, metal ratio 24 | 10 |
| Acetone | 32 |
| Isobutane | 60 |

To the adhesive prepared above is added the acetone and the carbonated calcium sulfonate. This mixture is charged to an aerosol container which is then fitted with a Newman-Green R–10–118 valve through which the isobutane propellent is added with agitation. The resulting composition (approximately 13% solids) is sprayable in a uniform pattern without excessive misting or cobwebbing.

EXAMPLE 7

TABLE II

| Composition [1] | Polymer base (weight ratio) | Weight (g.) | Carrier liquid | Weight | Incompatibilizing agent | Weight | Metal salt | Weight | Percent solid |
|---|---|---|---|---|---|---|---|---|---|
| A | Chloroprene/chlorinated rubber (9.55/3.85) | 87.7 | Naphtha, ethyl butyl ketone (53.5/11.7) | 378 | None | | | | 33 |
| A' | do | 87.7 | do | 378 | Ethanol | 100 | Calcium salt of didodecyl benzene sulfonate complexed with $CaCO_3$ (metal ratio 14) | 100 | 33 |
| B | Chloroprene | 67 | Toluene/petrobenzol/acetone (57/248/204) | 509 | None | | None | | [2] 18 |
| B' | do | 67 | do | 142.5 | Hexane | 95 | Calcium salt of didodecyl benzene sulfonate complexed with $CaCO_3$ (metal ratio of 14) | 16 | 33 |

[1] A and A' and B and B' contain conventional solid fillers and tackifying agents of the same type and quantity.
[2] The maximum solids content capable of being sprayed satisfactorily.

Solutions of the polymeric base and carrier liquid of the compositions of Table II are prepared. The carbonated metal salt and incompatibilizing agent are added to Compositions A' and B'. All mixtures are then charged to a Binks Model P–CGA–501FF sprayer. The minimal conditions necessary to spray satisfactorily each of the compositions is shown in Table III.

TABLE III

| Composition | Atomization pressure (p.s.i.g.) | Pot pressure (p.s.i.g.) | Air volume (cu. ft./min.) |
|---|---|---|---|
| A | 60–90 | 15 | 19.8 |
| A' | 5 | 5 | 0.7 |
| B | 60–90 | 15 | 20.0 |
| B' | 5 | 5 | 0.7 |

EXAMPLE 8

The compositions C, C', D, D', E, and E' containing the ingredients listed in Table IV are prepared.

TABLE IV

| Composition [1] | Polymer base (weight ratio) | Weight | Carrier liquid | Weight | Incompatibilizing agent | Weight | Metal salt | Weight |
|---|---|---|---|---|---|---|---|---|
| C | Chloroprene/chlorinated rubber (9.55/3.85) | 87.7 | Naphtha #7812/ethyl-butyl ketone (53.5/11.7) | 2,520 | Freon 12 | 725 | None | |
| C' | do | 87.7 | do | 387 | do | 140 | Ircogel 902 | 100 |
| D | Nitrile-butadiene rubber/vinyl resin (1:1) | 100 | Acetone | 3,900 | do | 1,000 | None | |
| D' | do | 100 | do | 110 | do | 100 | Ircogel 901 | 80 |
| E | Chloroprene | 67 | Toluene/petro/acetone (57/248/240) | 4,880 | do | 600 | None | |
| E' | do | 67 | do | 147 | do | 117 | Ircogel 900 | 10 |

[1] The compositions also contain conventional solid fillers and tackifying agents of the same type and quantity.

The above compositions are charged to an aerosol container at percent solids ranging from 2% to 30% by weight. Table V below shows the maximum percent solids content of the non-metal salt containing compositions C, D, and E) which can be effectively sprayed without squirting, formation of cobwebs, or other unacceptable spraying behavior. The metal salt containing compositions C', D', and E') did not reach the maximum solids content level for acceptable spray formation even at the 30% solids content level.

TABLE V

| Composition: | Percent solids |
|---|---|
| C | 5 |
| C' | 30+ |
| D | 2 |
| D' | 30+ |
| E | 2 |
| E' | 30+ |

The following table lists exemplary compositions which can be converted to sprayable compositions at commercially acceptable pressures and solids content by the incorporation therein of a carbonated metal salt as herein defined.

TABLE VI

| | Polymer base | Carrier liquid | Incompatibilizing agent |
|---|---|---|---|
| 1 | Chloroprene | Toluene | Ethanol. |
| 2 | do | 1,1,1-trichloroethane | Pentane. |
| 3 | do | Toluene/petroacetone | Acetone. |
| 4 | do | 1,1,1-trichloroethane | Dichlorodifluoromethane. |
| 5 | Styrene-butadiene rubber (e.g. SBR 1011) | Xylene | Propane. |
| 6 | Styrene-butadiene rubber | Heptane | Acetone. |
| 7 | do | Dichloromethane | Methanol. |
| 8 | Butadiene-acrylonitrile rubber | Methyl ethyl ketone | Hexane. |
| 9 | do | Ethyl acetate | Propanol. |
| 10 | do | Methyl ethyl ketone | Isobutane. |
| 11 | Polyurethane | Acetone | Pentane. |
| 12 | do | Ethyl acetate | Methanol. |
| 13 | do | Dimethyl formamide | Dichlorodifluoromethane. |
| 14 | Polyvinyl chloride | Methyl isobutyl ketone | Propane. |
| 15 | do | Cellosolve acetate | Ethanol. |
| 16 | do | Methyl ethyl ketone | Pentane. |
| 17 | Polyacrylate | Acetone | Propane. |
| 18 | do | Toluene/propanol | Pentane. |
| 19 | Butyl rubber | Hexane | Acetone. |
| 20 | do | Toluene | Methanol. |
| 21 | do | 1,1,1-trichloroethane | Isobutane. |

The carbonated metal salts in combination with the incompatibilizing agent enable many hitherto unsprayable compositions to be used in spray form. Such compositions having a polymeric base ingredient, especially an elastomer or rubbery component, are useful as coatings, sealants and adhesives for a variety of substrates including textiles, wood, plastics and metal. This invention provides compositions of the foregoing utility which display the further advantages of a high degree of portability and ease of application without suffering from the detrimental effects occasioned by the prior necessity for large volumes of air or carrier liquid.

What is claimed is:

1. A composition capable of spraying without cobwebbing or substantial misting comprising:
  (a) a polymeric base material selected from the class consisting of chloroprene, styrene-butadiene rubber, acrylonitrilebutadiene rubber, polyurethane, polyvinyl chloride, polyacrylate, butyl rubber, natural rubber, chlorinated natural rubber;
  (b) a volatile organic liquid solvent for said polymeric base material;
  (c) a carbonated basic metal salt of an organic acid having at least 12 aliphatic carbon atoms and a metal ratio of at least 3, said salt being present in an amount sufficient to prevent agglomeration of said polymer; and
  (d) an organic incompatibilizing agent selected from the class consisting of (1) a volatile liquid, and (2) a gas at room temperature and pressure, said agent being adapted and present in an amount sufficient to cause said polymeric base material to form relatively small, discrete, non-agglomerating particles in the presence of components (a), (b), and (c).

2. The composition of claim 1 wherein said organic incompatibilizing agent is a gas at room temperature and pressure.

3. The composition of claim 1 wherein said organic incompatibilizing agent is a volatile liquid at room temperature and pressure.

4. The composition of claim 1 wherein said metal salt of an organic acid is a metal sulfonate.

5. The composition of claim 1 wherein said metal salt of an organic acid is a metal sulfonate, said metal being selected from the class consisting of calcium, barium, and a mixture thereof.

6. The composition of claim 1 wherein said polymeric base material is chloroprene rubber.

7. A composition capable of spraying without cobwebbing or substantial misting comprising:
  (a) a polymeric material selected from the class consisting of chloroprene, styrene-butadiene rubber, acrylonitrilebutadiene rubber, polyurethane, polyvinyl chloride, polyacrylate, butyl rubber, natural rubber, chlorinated natural rubber;
  (b) a volatile organic liquid solvent for said polymeric material;
  (c) a carbonated metal sulfonate having at least 12 aliphatic carbon atoms and a metal ratio of at least 10, said metal being selected from the class of barium, calcium, and mixtures thereof, said salt being present in an amount sufficient to prevent agglomeration of said polymer; and
  (d) an organic incompatibilizing agent selected from the class of a volatile liquid and a gas at room temperature and pressure, said agent being adapted and present in an amount sufficient to cause said polymeric base material to form relatively small, discrete, non-agglomerating particles in the presence of components (a), (b), and (c).

8. The composition of claim 7 wherein said polymeric material is a chloroprene rubber.

9. A process for providing a sprayable composition comprising:
   (a) preparing a solution of a polymeric base material selected from the class consisting of chloroprene, styrene-butadiene rubber, acrylonitrilebutadiene rubber, polyurethane, polyvinyl chloride, polyacrylate, butyl rubber, natural rubber, chlorinated natural rubber and a volatile organic liquid;
   (b) adding thereto (1) a carbonated basic metal salt of an organic acid having at least 12 aliphatic carbon atoms and a metal ratio of at least 3, and (2) an organic incompatibilizing agent selected from the class consisting of a volatile liquid and a gas at room temperature and pressure;
   whereby said polymeric base material forms relatively small, discrete, non-agglomerating particles.

10. An aerosol type container fitted with a nozzle for emitting a spray, said container being charged with a composition capable of spraying without cobwebbing or substantial misting comprising:
   (a) a polymeric base material selected from the class consisting of chloroprene, styrene-butadiene rubber, acrylonitrilebutadiene rubber, polyurethane, polyvinyl chloride, polyacrylate, butyl rubber, natural rubber, chlorinated natural rubber;
   (b) a volatile organic liquid solvent for said polymeric base material;
   (c) a carbonated basic metal salt of an organic acid having at least 12 aliphatic carbon atoms and a metal ratio of at least 3, said salt being present in an amount sufficient to prevent agglomeration of said polymer; and
   (d) an organic incompatibilizing agent selected from the class consisting of (1) a volatile liquid, and (2) a gas at room temperature and pressure, said agent being adapted and present in an amount sufficient to cause said polymeric base material to form relatively small, discrete, non-agglomerating particles in the presence of components (a), (b), and (c).

References Cited
UNITED STATES PATENTS

| | | | |
|---|---|---|---|
| 3,331,801 | 7/1967 | Osmond et al. | 260—34.2 |
| 3,397,166 | 8/1968 | Semidle et al. | 260—34.2 |
| 3,441,530 | 4/1969 | Bauer et al. | 260—34.2 |
| 3,446,769 | 5/1969 | Opipari | 260—34.2 |
| 3,112,218 | 11/1963 | Spiller | 260—34.2 |
| 3,281,384 | 10/1966 | Dietz | 260—34.2 |
| 3,293,202 | 12/1966 | Weisman | 260—34.2 |
| 3,312,618 | 4/1967 | LeSuer et al. | 252—33 |
| 3,332,903 | 7/1967 | Kavalir | 260—33.6 |

ALLAN LIEBERMAN, Primary Examiner

U.S. Cl. X.R.

260—29.7 R, 29.7 SQ, 31.2 N, 31.2 MR, 31.2 R, 31.4 R, 32.6 A, 32.6 N, 32.6 R, 32.8 A, 32.8 N, 32.8 R, 33.4 R, 33.4 UR, 33.6 A, 33.6 UB, 33.6 UA, 33.8 UB, 33.8 UA, 33.8 R, 34.2, 760

UNITED STATES PATENT OFFICE
CERTIFICATE OF CORRECTION

Patent No. 3,776,873      Dated December 4, 1973

Inventor(s) Leon V. Kremer

It is certified that error appears in the above-identified patent and that said Letters Patent are hereby corrected as shown below:

Col. 5, Table I, in the footnotes, line 15,

"b Union Carbide Corp. tradename for a para-tertiary butyl phenol formaldehyde resin" should read -- b Tradename of Merck Chemical Co. for magnesium oxide --

Please add footnote- c Union Carbide Corp. tradename for a para-tertiary butyl phenol formaldehyde resin --

Signed and sealed this 16th day of April 1974.

(SEAL)
Attest:

EDWARD M. FLETCHER, JR.
Attesting Officer

C. MARSHALL DANN
Commissioner of Patents